United States Patent [19]

Lampenius

[11] Patent Number: 4,529,520

[45] Date of Patent: Jul. 16, 1985

[54] SCREEN PLATE

[75] Inventor: Harry Lampenius, Varkaus, Finland

[73] Assignee: A. Ahlstrom Osakeyhtio, Noormarkku, Finland

[21] Appl. No.: 472,742

[22] Filed: Mar. 7, 1983

[30] Foreign Application Priority Data

Jan. 26, 1983 [FI] Finland .................................. 830256

[51] Int. Cl.$^3$ .............................................. B01D 39/10
[52] U.S. Cl. .................................... 210/498; 209/397
[58] Field of Search .................... 210/304, 388, 512.1, 210/497.01, 498, 402, 403, 415, 384, 499; 209/269, 270, 308, 309, 392, 393, 397, 286, 300, 331, 341, 399; 162/308, 317, 352, 209, 372, 374

[56] References Cited

U.S. PATENT DOCUMENTS

| | | | |
|---|---|---|---|
| 492,039 | 2/1893 | Meurer | 209/269 |
| 729,693 | 6/1903 | Steinkoenig | 210/498 |
| 790,043 | 5/1905 | Fiedler et al. | 210/498 |
| 1,067,263 | 7/1913 | McLean | 209/397 |
| 1,398,997 | 12/1921 | Benson | 209/397 |
| 1,467,759 | 9/1923 | Hall | 209/397 |
| 1,928,216 | 9/1933 | Apel | 209/397 |
| 2,301,514 | 11/1942 | Brewster | 209/397 |
| 2,319,901 | 5/1943 | Hall | 209/269 |
| 2,632,366 | 3/1953 | Ahlfors | 209/269 |
| 2,827,169 | 3/1958 | Cusi | 209/397 |
| 3,909,400 | 9/1975 | Seifert | 209/397 |
| 4,200,537 | 4/1980 | Lamort | 210/415 |
| 4,276,159 | 6/1981 | Lehman | 209/397 |

FOREIGN PATENT DOCUMENTS

| | | | |
|---|---|---|---|
| 972322 | 8/1975 | Canada | 209/397 |
| 1148119 | 6/1983 | Canada . | |
| WO82/02345 | 7/1982 | PCT Int'l Appl. | 209/397 |
| 427124 | 7/1981 | Sweden . | |

Primary Examiner—Ivars Cintins
Attorney, Agent, or Firm—Bucknam and Archer

[57] ABSTRACT

A screen plate with grooves is described. The grooves are provided at the bottom with perforations. The direction of the grooves substantially deviates from the flow direction of the pulp to be screened. By different inclination of the side planes of the grooves the turbulance force on the pulp can be varied to meet the different needs of various screening applications.

3 Claims, 8 Drawing Figures

SCREEN PLATE

The present invention relates to a screen plate which is intended primarily for the screens used in screening the pulps of paper and pulp industry.

An essential process in the production of paper is the screening of pulp wherein the impurities and sticks present in the mass are removed, since they are detrimental to the quality of the pulp. This is carried out at different stages by means of a flat screen, centrifugal screen or pressure screens. The most essential part of these apparatuses is a screen plate with round perforations or elongated slots. In pressure screens and centrifugal screens one or two concentric cylindrical screen drums are used as the screen member.

The screening force is the pressure difference between the feed and the accept or the centrifugal force, which presses the accept through the perforations or slots of the screen plate and the reject against the plate surface for reject discharge.

A typical pressure screen comprising a cylindrical screen is shown and described in the U.S. Pat. No. 3,458,083. The screen operates completely filled with liquid and the material to be screened is brought tangentially to the upper part of the screen. The material to be screened is conveyed between a rotary member and the inner surface of the screen drum. The accept is removed through the perforations of the screen drum and the reject is pushed along the surface of the screen plate to the bottom of the screen. The screen surface is kept clean by means of portions of the rotor which moves adjacent the screen surface.

The surfaces of conventional screen plates are smooth. Canadian Pat. No. 972.322 discloses a screen plate which is not smooth. The surface of this plate is provided with recesses in order to get perforations on a slanting surface in such a manner that the downstream edges of the screen plate perforations are located lower than the upstream edges of the perforations. In one application of this patent, there are V-shaped grooves on the surface of the screen plate, whereby the perforations are located on the upstream side plane of the groove. This solution is not, however, the best possible with respect to screening. When a good screening result is desired, there are two conflicting requirements. On the one hand, the obtained pulp should be as clean as possible, which requires an apparatus with very small perforations, but on the other hand, the maximum amount of accept should be removed from the pulp, which in view of the penetration requires a relatively large open perforated area.

The following factors affect the screening mechanism in pressure screens:
 (a) the hydrodynamic conditions around the screen perforations
 (b) felting and filtering, i.e. the interaction between the fibers
 (c) the relative size difference between the perforations or the hole or slot pitch and the particles.

Presently attempts are being made to affect these factors so that an optimum result is obtained for every kind of pulp. There are, however, restricting factors which by means of a properly shaped screen plate can be eliminated or attenuated.

Three separate pulp layers are formed in the radial direction of the screen near the screen plate. These layers are different as regards their fiber and stick contents. The layer nearest to the screen plate is mostly fibers of prime quality. The next layer contains long fibers, stiff fiber bundles and sticks. The layer farthest from the screen plate contains fibers and coarser particles. The properties of this layer are quite similar to those of the pulp fed in.

It is very decisive with regard to the screening efficiency that strong hydrodynamic flows are caused to act close to the perforations in the layer of prime quality fibers which is adjacent the screen plate surface. The free movement of these flows is prevented by the layer having a high stick and fiber bundle content and forming a net. A screen plate according to the invention decreaes the disadvantageous effect caused by this layer by leaving free space for flows in axial directions. The net cannot touch the bottom of the groove. Furthermore, the edges of the groove and the net on top of it prevent radial flow, whereby the axial flows are increased.

In addition to the cleanness of the accept, an other essential result as regards screening is the fact that not too many prime-quality fibers are lost together with the reject.

In order to reach ideal screening, the pulp should remain in the screening zone as a homogenous suspension. Yet in practise flocculation and felting occur. Fiber flocks are easily rejected and along them, also prime-quality fibers. In the surface of the screen plate according to the invention, the groove tops bring about microturbulences which cause the fiber flocks to disintegrate and thus prevent couching. A higher long fiber yield is thus obtained, as the long fibers in particular tend to felt.

When the hole or slot size is decreased, the capacity decreases sharply and it is impossible to increase the open area by means of decreasing the pitch, for long fiber pulps in particular. If that is done, two adjacent holes tend to accept the same fiber and the fiber is stuck in its both ends in both holes. This so called stapling phenomenon rapidly cloggs the screen plate. This results in the fact that the capacity of slot screen plates in particular is often limited due to the stapling phenomenon.

In the screen plate according to the invention, the effective distance between two adjoining slots or holes is approximately 1.5 times the pitch, wherefore the pitcch can be decreased compared to a conventional screen plate, but without the risk of the stapling phenomenon. Thus a higher capacity can be obtained, which especially in slot drums is a very big advantage.

In the trials carried out, the above presented theories are supported by the increased capacity and the decreased stick content of the accept.

The screen plate according to the invention is characterized in that the perforations of the screen plate are located at the bottom of grooves the direction of which deviates from the flow direction of the pulp to be screened. The form of the grooves is dicatated by the characteristics of the pulp to be screened. By changing the geometrics of the side walls of the grooves the turbulence force on the fiber net can be adjusted.

In cases where smooth screening is required or e.g. for vibrating screens, the upstream side plane is perpendicular to the envelope surface of the screen surface and the downstream side planes are slanting with regard to said surface.

In a case where a strong turbulence can be used for achieving a high capacity and a disintegrating effect is positive, e.g. for waste paper, the upstream side plane is slanting and the downstream side plane perpendicular with regard to the screen surface.

The invention will be described in more detail in the following with reference to the accompanying drawings, in which.

Figure 2A:
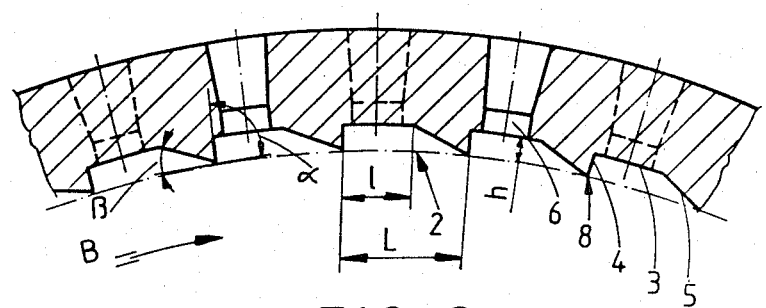
FIG. 2a is an enlarged sectional view taken on line A—A of FIG. 1.
Figure 2B:
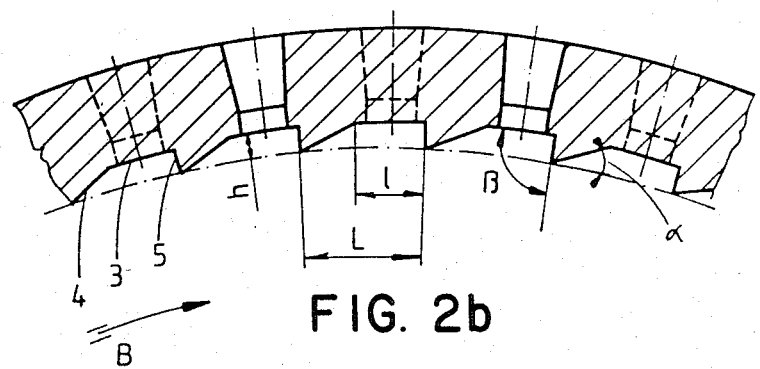
Figure 3:
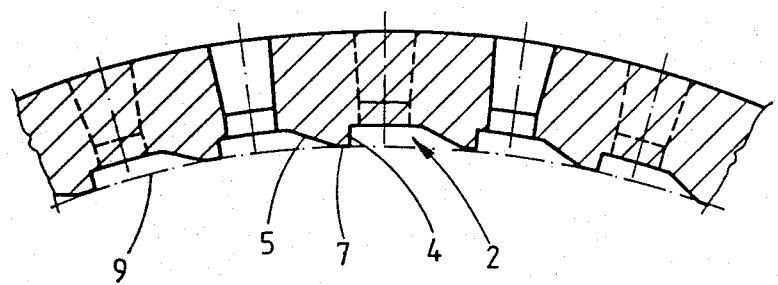
Figure 4:
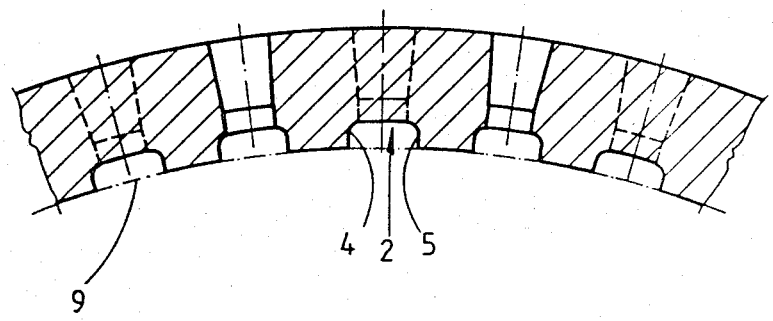
Figure 5:
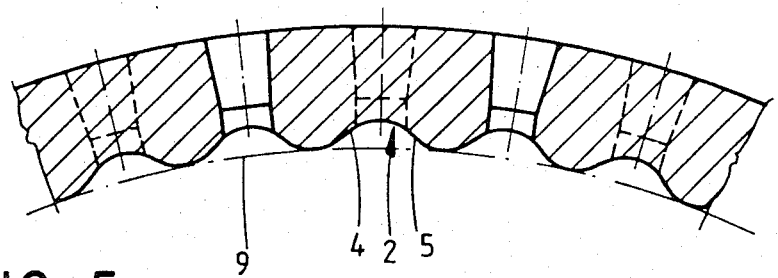
Figure 6A:
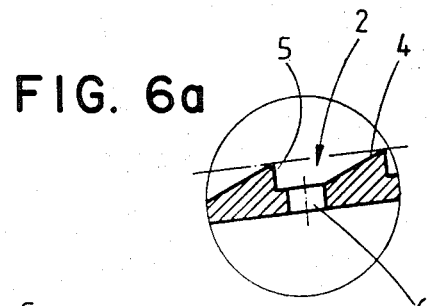
Figure 6:
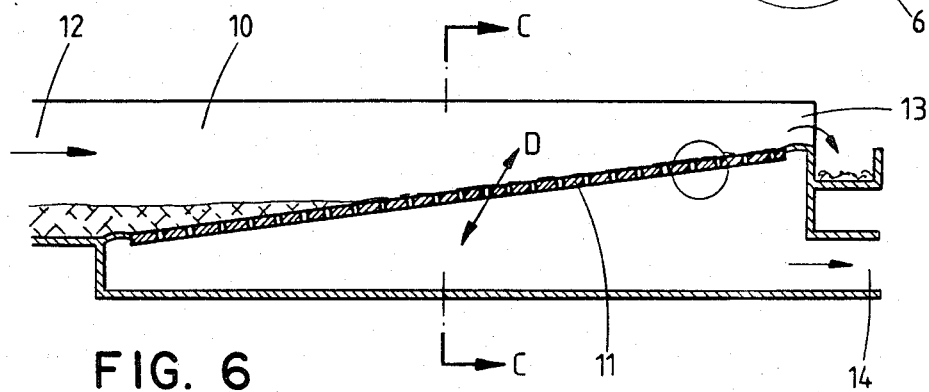
Figure 7:
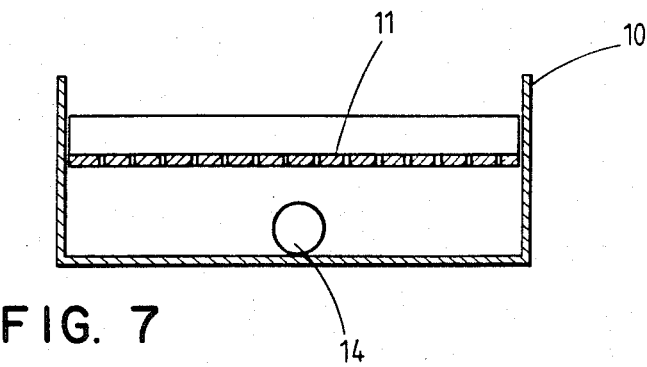

FIG. 2b shows a sectional view corresponding to FIG. 2a of another embodiment of the invention FIG. 3 shows an alternative embodiment of the invention, FIG. 4 shows another alternative embodiment of the invention, FIG. 5 shows still another alternative embodiment of the invention, FIG. 6 shows a vertical sectional view of a vibrating screen embodying the invention, and FIG. 7 shows a cross section along the line C—C of FIG. 6.

Figure 1:
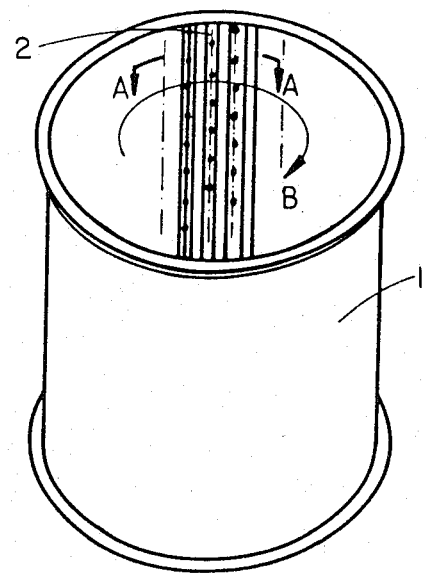
FIG. 1 shows a screen drum in which the invention is applied.

Referring now to FIG. 1, grooves 2 which are parallel to the axis have been made onto the inner surface of a screen drum 1. The pulp is caused to rotate in the screen in the direction of arrow B and it moves at the same time in the direction of the rotational axis towards the reject end of the drum. As the component in the direction of the circumference of the movement is considerably bigger than the component in the direction of the axis, the angle between the direction of the grooves and the flow direction of the pulp does not substantially differ from a right angle.

According to the advantageous embodiments illustrated in FIGS. 2a and 2b, the groove is formed of a bottom plane 3 which is substantially parallel with the envelope surface of the screen surface, an upstream side plane 4 and a downstream side plane 5. In FIG. 2a the angle between the envelope surface of the screen surface and the upstream side plane 4, or more exactly expressed, between the plane tangenting the envelope surface of the screen surface close to this side plane and this side plane is thus approximately 90° and the angle between the envelope surface of the screen surface and the downstream side plane 5 is 5°-60°, preferably approximately 30°. With this form a pulsative movement of the fiber net that is formed on the screen surface is obtained without breaking it completely.

FIG. 2b shows a form that aims to break the fiber net vigorously. Here the angle is 5°-60° and the angle α is 90°. The perforations 6 of the screen plate are disposed on the bottom planes 3 of the grooves.

The width (1) of the bottom plane of the groove is at least as big as the diameter or width of the perforations. The height (h) of the upstream side plane 5, i.e. the depth of the grooves may be bigger or smaller than the diameter or length of the perforations, preferably 0.4 to 4 mm, depending on the pulp being treated. The total width (L) of the grooves is determined by the hole or slot pitch.

The alternative embodiment illustrated in FIG. 3 differs from the previously presented mainly in that between the side planes 4 and 5 of the grooves 2 there is a surface 7 in a direction parallel to that of the the evelope surface 9 of the screen surface. The object of this surface is to improve the wear resistance of the screen plate compared to the screen plate according to FIG. 2, where the point 8 formed by the side planes 4 and 5 may be susceptible to abrasion.

In the embodiment illustrated in FIG. 4, the grooves 2 are U-shaped, whereby both side planes 4 and 5 are substantially perpendicular to the envelope surface 9 of the screen surface.

In the embodiment illustrated in FIG. 5, the screen surface is undulant and both sides 4 and 5 of the grooves 2 are inclined with regard to the envelope surface 9 of the screen surface.

The screening apparatus shown in FIGS. 6 and 7 includes a vat 10 in which a screen plate 11 is disposed at an angle to the horizontal with one end higher than the other. The screen plate is resiliently mounted and adapted for vibration in a manner known per se. The vat includes an inlet 12 for the supply of the unscreened material suspension on the upper surface of the screen plate in such a way that a pond of material suspension is formed over the lower portion of the screen plate, an outlet 13 for the rejected portion of the material at the upper end of the screen plate and an outlet 14 in the lower part of the vat for the accepted fraction passing through the openings 6 in the screen plate. The screen plate is vibrating in a direction shown by the arroww D causing the material on the surface of the screen plate to move towards its upper end and the reject outlet. The openings of the screen plate are disposed at the bottom of grooves 2 the direction of which substantially deviates from the flow direction of the material to be screened. The upstream side planes 5 of the grooves are substantially perpendicular to the envelope surface of the screen surface. The downstream side planes 4 of the grooves are inclined with regard to the envelope surface.

While specific embodiments of the invention have been described in detail above, it is to be understood that various modifications may be made from the specific details described without departing from the spirit and scope of the invention.

What is claimed is:

1. A cylindrical screen plate for screening smoothly unscreened pulp and for separating the accept portion of the pulp from the reject portion of the pulp, the screen plate having an inlet on one side for introducing the unscreened pulp, an outlet at the opposite side for removing the reject portion and having an envelope surface, the screen plate being provided with means for moving the unscreened pulp along one first flow direction, the screen plate having grooves in the side of the inlet recessed in the screen surface, said first flow direction being essentially transverse to the grooves, the grooves being formed of an upstream side plane, a downstream side plane and a bottom plane, said bottom plane being substantially parallel to the envelope surface of the screen plate, the grooves having perforations in the bottom plane, the upstream side plane of the grooves being substantially perpendicular to said envelope surface and the downstream side plane of the grooves forming a 60°–5° angle against said envelope surface.

2. A screen plate according to claim 1 wherein the downstream side plane of the grooves forms an approximately 30° angle against the envelope surface of the screen plate.

3. The screen plate according to claim 2 wherein the downstream side plane and the upstream side plane of the grooves are connected to each other by means of a surface substantially parallel to said envelope surface.

* * * * *